May 21, 1963  J. S. SCOGGIN  3,090,774
SEPARATION OF POLYMER FROM SOLVENT
Filed June 16, 1960
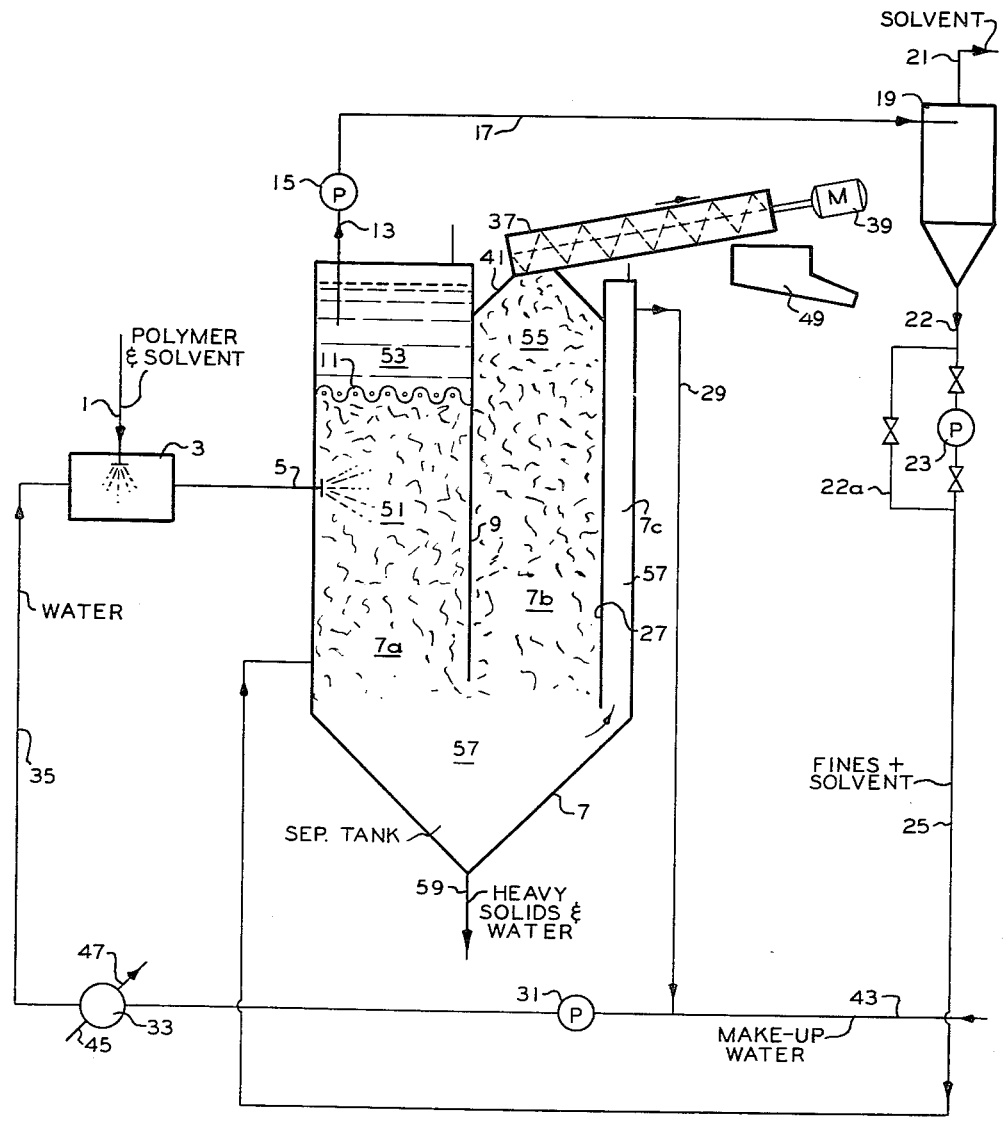
INVENTOR.
J.S. SCOGGIN
BY Hudson & Young
ATTORNEYS United States Patent Office 3,090,774
Patented May 21, 1963

3,090,774
SEPARATION OF POLYMER FROM SOLVENT
Jack S. Scoggin, Bartlesville, Okla., assignor to Phillips Petroleum Company, a corporation of Delaware
Filed June 16, 1960, Ser. No. 36,647
7 Claims. (Cl. 260—85.3)

This invention relates to recovery of olefin polymers from hydrocarbon solutions thereof. In one aspect, it relates to the separation of solid polymers of 1-olefins from liquids comprising water and hydrocarbon.

It is known in the art to prepare polymers of aliphatic olefins, such as 1-olefins, in the presence of a liquid hydrocarbon. This hydrocarbon acts as a diluent and under certain conditions also acts as a solvent for the monomer and for the polymer after it is produced. U.S. Patent 2,825,721, Hogan et al., dated March 4, 1958, discloses and claims a novel method for producing such polymer. The method of this present invention is particularly applicable for the separation of polymer prepared in the presence of a chromium oxide catalyst as disclosed in the above-mentioned Hogan et al. patent. It is not limited thereto, and is also applicable to recovery of polymer from diluent or solvent regardless of the particular method of polymer production. This present application is related to copending applications Serial No. 799,258, filed March 13, 1959, Serial No. 712,908, filed February 3, 1958, to an application filed May 25, 1959, Serial No. 815,681, and to an application filed November 19, 1956, Serial No. 623,075. This latter application is now allowed, now Patent No. 2,955,714.

An object of this invention is to provide an improved method and apparatus for separating polymer from diluent. Another object of this invention is to provide an improved method and apparatus for the separation of polymer from diluent and water. Another object of this invention is to provide an improved method and apparatus for the separation of polymer dispersed in water and in diluent or solvent. Still other objects and advantages will be realized upon reading the following description which, taken with the attached drawing, forms a part of this specification.

Solid olefin polymers are prepared by contacting the olefin to be polymerized with a catalyst at an elevated temperature and pressure, often in the presence of a solvent or diluent material. The reaction product can be one of a wide variety of olefin polymers, such as for example, polymers or copolymers of monoolefins like ethylene, propylene, butylene, etc., also copolymers of monoolefins with diolefins such as butadiene, isoprene, etc.

The temperature required for polymerizing olefins varies over a wide range. However, usually it is preferred to carry out the reaction at a temperature between about 150° and about 450° F. The particular temperature to be employed in each individual case depends on the catalyst employed, the olefin to be polymerized and the operating conditions employed, such as pressure, space velocity, diluent to olefin ratio, etc.

The polymerization pressure is often maintained at a sufficient level to assure a liquid phase reaction, that is, at least about 100 to 300 p.s.i.g. (pounds per square inch gauge), depending upon the type of material in the polymerization temperature. Higher pressures up to 500 to 700 p.s.i.g. or even higher can be used, if desired. When utilizing a fixed catalyst bed, the space velocity varies from as low as about 0.1 to about 20 volumes of feed per volume of catalyst per hour, with the preferred range being between about 1 and about 6 volumes per volume per hour. The polymerization process can also be carried out in the presence of a mobile catalyst. In this type of operation, the catalyst concentration in the reaction zone is maintained between about 0.01 and about 10 percent by weight and the residence time is from about 10 minutes or less to 10 hours or more.

A preferred polymerization method is described in detail in the above-mentioned Patent 2,825,721. The particular method described in this patent utilizes a chromium oxide catalyst, preferably containing hexavalent chromium, with silica, alumina, silica-alumina, zirconia, thoria, etc. In one embodiment described therein, olefins are polymerized in the presence of a hydrocarbon diluent, for example, an acyclic, alicyclic or aromatic compound or hydrocarbon which is inert and in which the formed polymer is soluble. The reaction is ordinarily carried out at a temperature between about 150° and about 450° F. and usually under a pressure sufficient to maintain the reactant and diluent in the liquid state. The polymers produced by this method, particularly polymers of ethylene, are characterized as having an unsaturation which is principally either trans-internal or terminal vinyl, depending on the particular process conditions employed. When low reaction temperature, for example about 150° to 320° F., and a mobile catalyst are used for polymerization, the product polymer is predominantly terminal vinyl in structure. When polymerization is carried out at a higher temperature and in a fixed bed catalyst, the polymer has predominantly trans-internal unsaturation. Polymers prepared by both methods are also characterized by their high densities and high percentage of crystallinity, usually greater than 90 percent at normal atmospheric temperature.

The solvent or diluent employed in such polymerization reactions include in general, paraffins which can at least partially dissolve the polymers at the temperature employed in the reaction zone. Among the more useful solvents are paraffins having between about 3 and about 12 carbon atoms per molecule, such as, for example, propane, isobutane, normal pentane, isopentane, isooctane, etc., and preferably those paraffins having 5 to 12 carbon atoms per molecule. Also useful in the polymerization reaction as solvents or diluents are alicyclic hydrocarbons, such as cyclohexane, methylcyclohexane, etc. Aromatic diluents are also used, however, in some instances, they (or impurities therein) tend to shorten the catalyst life, therefore their use will depend upon the importance of the catalyst life. All of the foregoing and in addition other hydrocarbon diluents which are relatively inert and in the liquid state at the reaction conditions can also be used in carrying out the reaction of olefins to form solid polymers.

It is apparent from the foregoing discussion that the solid polymers prepared by the aforementioned methods are present in the reaction effluent as a solution of polymer in a solvent or diluent. Inasmuch as the major uses of the polymers require a solid product, it is desirable that the polymer be separated from the solvent. Several methods have been proposed for treating the polymer solution to accomplish this purpose. In one method, the polymer solution is sprayed in liquid water whereby the polymer is precipitated and dispersed in the water. The above-mentioned copending applications, Serial Nos. 623,075, 815,681, 799,258 and 712,908, describe methods of injecting the polymer containing solution into water for precipitation and dispersion of the polymer. As a result of such treatment, the polymer product is obtained as a slurry of subdivided solids in a mixture of water and solvent. To obtain the desired dry polymer product, the slurry is treated either first for the removal of the major portion of the solvent and then for removal of the water or the polymer can be removed from the solvent and water in substantially a single general operation. In one method, solvent removal is effected by steam distillation of the solvent following which the water is removed from the polymer. Such an operation involving distillation of solvent requires provision of a distillation vessel and the use of heat for effecting the distillation. Furthermore, the polymer and water mixture removed from this distillation operation frequently requires cooling prior to separation of the solid polymer from the water.

According to the present invention, I provide apparatus and a method for removing polymer from a mixture of solvent and water without resorting to high temperature distillation and in substantially one unitary piece of equipment. In this manner, the cost of equipment required for the separation operation is maintained at a minimum. Furthermore, utility costs for operating the process as a whole are also maintained at a minimum.

The drawing illustrates an arrangement of apparatus parts suitable for carrying out the process of this invention.

In the drawing, reference numeral 1 identifies a conduit or pipe through which the solution of polymer in solvent, as produced, is conducted to the herein disclosed separating apparatus. In mixer or spray chamber 3 is maintained a body of relatively cool water into which the solution of polymer in solvent is sprayed from pipe 1. The resulting cooled mixture of precipitated solid polymer, diluent or solvent, and water, are passed from spray vessel 3 through a conduit 5 into a separating vessel 7.

This separating vessel 7 is provided with a partition 9 extending from the top thereof to a point some little distance above the conical bottom of the vessel. A second partition 27 extends as illustrated to a point somewhat closer to the conical bottom of the vessel than partition 9. Partition 27 defines one wall of a weir or water outlet compartment 7c of the vessel. A perforate plate or screen 11 is disposed across compartment 7a of this vessel as illustrated. This perforate plate or screen is intended to contain perforations or openings sufficiently small to prevent passage of at least a major portion of the precipitated polymer particles. The hydrocarbon diluent or solvent used possesses a density less than that of water while the polymer possesses a density between that of the solvent and that of the water. Thus, the water passes into the bottom of vessel 7 while the diluent rises through the screen or perforate plate 11 into the upper portion of the compartment 7a. Obviously, a portion of the polymer particles finer than the screen or perforation openings passes through these openings along with the diluent into the upper portion of compartment 7a. Such diluent 53 and entrained finely divided polymer are withdrawn from the upper portion of this compartment through a conduit 13 and are transferred by a pump 15 through a conduit 17 to a separator 19. This separator 19, in one case, is a cyclone separator in which the heavier polymer particles are separated along the inner periphery of the vessel and are withdrawn along with a small proportion of the solvent through a conduit 22. The remaining solvent substantially free of solid polymer is withdrawn from this separator through a conduit 21 for recycling to the polymerization process or for such other disposal as desired. The withdrawn finely divided polymer and solvent are transferred from conduit 22 by a pump 23 through a conduit 25 into the lower portion of the compartment 7a. Separator 19 can be a gravity separator, or if desired it can be a cyclone separator. If it is a cyclone separator, bottoms from the separator are bypassed from pumps 23 by closing valves in conduits 22 and 25 and opening the valve in conduit 22a.

A mass of larger particles of polymer 51 which cannot and do not pass through the interstices of the perforate plate or screen 11 accumulates or builds up in volume on the under side of the screen. This building up on the under surface of the screen 11 results from the fact that the polymer is lighter or less dense than water and tends to float upon the surface thereof. Thus, the large polymer particles entering compartment 7a build up under the screen 11 until such time as the entire or substantially the entire lower portion of the compartment 7a is filled with these large polymer particles. At this, these large particles pass below the lower end of partition 9 into the compartment 7b. In this compartment, there is substantially only water and polymer particles 55. Thus, the polymer particles which enter this compartment quickly rise to the top thereof. At this position, the polymers enter the lower end of a screw conveyor 37. This screw conveyor transfers the wet polymer particles upward and discharges them into a polymer disposal means 49. While passing through this conveyor, the polymers are rotated and moved and are given an opportunity to free themselves from excess water. The water freed from the polymer flows downward along the bottom wall of the conveyor and is returned into the compartment 7b. Water from the lower portion of compartment 7b flows under the lower end of partition 27 into the weir compartment 7c. This compartment is provided with an outlet communicating with a water removal conduit 29. The level of the water 57 in compartment 7c is adjusted to a desired elevation by the proper positioning of the outlet in the wall of tank 7 connected with the disposal pipe 29. Water withdrawn from the weir compartment 7c passes through conduit 29 under the influence of a pump 31 and is cooled in a heat exchanger 33. This cooled water is transferred on through a conduit 35 and is passed into the spray chamber 3 as the aforementioned cool water. Cooling water from a source, not shown, enters heat exchanger 33 through a pipe 45 and leaves this exchanger through a pipe 47 for such disposal as desired. Ordinarily, conventional plant cooling water is satisfactory for the proper operation of the exchanger 33.

The upper end of the separating compartment 7b is constructed as frusto-conical member 41. The frusto-conical shape of this compartment is for the purpose of directing the floating polymer into the inlet end of screw conveyor 37. The screw of this conveyor is rotated by a motor 39.

Make-up water for use in this system is provided from a source, not shown, through a conduit 43.

In one case, the stream of water from heat exchanger 33 flowing through conduit 35 into the spray chamber 3 is maintained at a temperature of approximately 100° F. However, it is not necessary that the temperature of this water be maintained at this particular value but the temperatures can vary on either side of this stated temperature and still operate as a satisfactory coolant and precipitant for the polymer from the solvent solution from conduit 1. Sufficient water is provided from conduit 35 so that the hot solution of diluent and polymer can be cooled to a temperature in the order of 100° to 125° F. Thus, this latter temperature, that is between 100° and 125° F. is maintained in the vessel 7.

The upper end of compartments 7a and 7c can, if desired, be open to the atmosphere. However, it is preferable that these compartments be closed but provided with breather tubes. The use of covers or closures for these compartments is preferred in order to eliminate entry of dust and dirt or other undesired solid materials.

The screen 11 is preferably a 100 mesh screen, Tyler standard screen scale. However, the screen openings can be other than those of a 100 mesh screen. For example, screens of 32 mesh, or 200 mesh can be used, as well as screen sizes between these limits. Furthermore, the screen can be of the vibrating or shaker type as well as of the fixed or nonvibrating type.

Specific Example

In one instance the operating conditions are as follows:

| Stream | Temperature, °F. | Pressure, p.s.i.a. |
|---|---|---|
| (1) Polymer solution | 250 | 250 |
| (3) Mixing zone | 110 | 75 |
| (7) Separator | 110 | atmospheric |
| (19) Separator | 110 | 45 |
| (35) Dilution water | 100 | 75 |
| (25) Recycle | 110 | 45 |

While the above example illustrates one mode of operation of the apparatus as herein disclosed, the invention is not limited to the temperatures and pressures given. The temperatures and pressures at the above given process points can be varied within the following limits and yet remain within the intended spirit and scope of the invention.

| Stream | Temperature Range, °F. | Pressure Range, p.s.i.a. |
|---|---|---|
| (1) Polymer solution | 230–325 | 150–300 |
| (3) Mixing zone | 100–150 | 100–45 |
| (7) Separator | 100–150 | Atm.–45 |
| (19) Separator | 100–150 | Atm.–65 |
| (35) Dilution water | 100–140 | 100–45 |
| (25) Recycle | 100–150 | Atm.–65 |

The following tabulation is a material balance based on treatment of a cyclohexane solution of a polyethylene polymer:

MATERIAL BALANCE, POUNDS PER STREAM DAY

| Stream No. | Cyclohexane | Polymer | Water | Ash | Total |
|---|---|---|---|---|---|
| 1 | 753,334 | 39,666 | | 10 | 793,010 |
| 35 | | | 5,666,000 | | 5,666,000 |
| 25 | 6,000 | 1,900 | | | 7,900 |
| 5 | 753,324 | 39,666 | 5,666,000 | 10 | 6,459,010 |
| 17 | 739,334 | 2,000 | | 200 | 741,534 |
| 11 | | | 100 | 10 | 110 |
| 29 | | | 5,605,700 | | 5,605,700 |
| 21 | 733,334 | 100 | | 200 | 733,634 |
| 43 | | | 60,300 | | 60,300 |
| 49 | 20,000 | 39,566 | 60,000 | | 119,566 |

It is noted that the ash contained in stream 11 is largely rust particles and such other solid matter as is more dense than water.

While certain embodiments of the invention have been described for illustrative purposes, the invention obviously is not limited thereto.

I claim:

1. In the separation of solid polymer from a slurry comprising said solid polymer having a density less than that of water, a liquid diluent of lower density than the densities of said polymer and liquid water, the improvement comprising passing said slurry into a first separation zone having an upper end portion, an open lower end portion, and a perforate zone intermediate said upper end portion and said lower end portion and at a level below and spaced from said perforate zone, separating said liquid diluent from said polymer by passing said liquid diluent upwardly through said perforate zone and retaining said polymer adjacent the underside thereof, withdrawing liquid diluent from said upper end portion and passing solid polymer and water through said open lower end portion into a second separation zone, and withdrawing polymer from the upper portion and water from the lower portion of said second separation zone.

2. The separation of solid polymer from a slurry comprising said solid polymer having a density less than that of water, a liquid diluent of lower density than the densities of said polymer and liquid water, comprising passing said slurry into a first separation zone having an upper end portion, an open lower end portion and a perforate zone intermediate said upper and lower end portions and at a level below and spaced from said perforate zone, passing said liquid diluent upward through said perforate zone and withdrawing said diluent from the upper end portion of said separation zone, accumulating solid polymer beneath and adjacent said perforate zone until the accumulated polymer reaches said open lower end portion, passing water and accumulated polymer through said open lower end portion into a second separation zone and from this second separation zone removing solid polymer from the upper portion and water from the lower portion thereof.

3. In the process of claim 2 removing said solid polymer from the upper portion of said second separation zone by passing said polymer up an inclined surface whereby further separation of water and polymer is obtained and the further separated water drains from the separated polymer and returns to said second separation zone.

4. The separation of solid polymer from a slurry comprising said solid polymer having a density less than that of water, a diluent of lower density than the densities of said polymer and liquid water, comprising passing said slurry into a first separation zone having an upper end portion, an open lower end portion and a perforate zone intermediate said upper and lower end portions and at a level below and spaced from said perforate zone, passing liquid diluent and polymer of particle size smaller than the perforations of said perforate zone through said perforate zone and withdrawing said liquid diluent and polymer of particle size smaller than said perforations from the upper end portion of said separation zone, separating said polymer of small particle size from the withdrawn liquid diluent by centrifugal action and returning the separated polymer to said first separation zone at a level intermediate said perforate zone and said lower end portion, accumulating solid polymer beneath said perforate zone until the accumulated polymer reaches said open lower end portion passing liquid water and accumulated polymer through said open lower end portion into a second separation zone and from this second separation zone removing solid polymer from the upper portion and liquid water from the lower portion thereof.

5. A method for recovering solid polymer from a solution of polymer in a polymer solvent comprising injecting said solution of polymer in solvent at a temperature of about 280° to 300° F. under liquid phase conditions into cool liquid water whereby solid polymer is precipitated, passing the mixture of water, solvent and precipitated polymer into a first separation zone having an upper end portion, an open lower end portion and a perforate zone intermediate the end portions and at a level below and spaced from said perforate zone, passing liquid solvent and polymer of particle size smaller than the perforations of said perforate zone upwardly through said perforate zone and withdrawing this latter solvent and polymer from the upper portion of said first zone, separating polymer from liquid solvent withdrawn from said first zone by centrifugal action and returning the separated polymer to said first separation at a level intermediate said perforate zone and said lower end portion, accumulating solid polymer larger than said perforations beneath and adjacent said perforate zone until the accumulated polymer reaches said lower open end portion, passing water, accumulated polymer and entrained polymer of size smaller than said perforations through said lower end portion into a second separation zone and from this second separation zone removing solid polymer from the upper portion thereof by passing same up an inclined surface whereby further separation of polymer from water occurs, returning this separated water to said second separation zone and removing water from said second separation zone, cooling this removed water, returning the cooled water to the injecting step as the aforementioned cool water and withdrawing polymer from the upper end of said inclined surface as the product of the operation.

6. An apparatus comprising a vessel having its longitudinal axis vertically disposed, a nonperforate partition extending downward from the top of said vessel dividing same into two compartments, said partition terminating short of the bottom of the vessel thereby providing a free passageway below said partition connecting the bottom of said compartments, perforate means horizontally across one of said compartments at a level approximately midway from the top of said one of said compartments and the lower end of said partition, said one of said compartments having an inlet for inlet of a slurry to be treated at a level below said perforate means but above the lower end of said partition, the other of said compartments having its top end closed, said top end being provided with an opening, an inclined screw conveyor, the lower end of said conveyor being in communication with said opening, a weir in said other compartment for overflow of liquid, said weir comprising a second partition extending downward in said other compartment dividing same into still another and weir compartment, this second partition also terminating short of the bottom of the vessel thereby providing a free passageway below this second partition connecting the bottoms of the other compartment and the weir compartment, said weir compartment having a vertically adjustable overflow conduit, a centrifugal separator, means for transferring liquid containing suspended solid matter from the upper portion of said one compartment to said centrifugal separator, and a conduit communicating the lower end of said centrifugal separator with said one compartment at a level below said perforate means for passage of separated liquid.

7. An apparatus comprising a vessel having its longitudinal axis vertically disposed, a nonperforate partition extending downward from the top of said vessel dividing same into two compartments, said partition terminating short of the bottom of the vessel thereby providing a free passageway below said partition connecting the bottoms of said compartments, perforate means horizontally across one of said compartments at a level approximately midway from the top of said one of said compartments and the lower end of said partition, said one of said compartments having an inlet for inlet of a slurry to be treated at a level below said perforate means but above the lower end of said partition, the other of said compartments having its top end closed, said top end being provided with an opening, an inclined screw conveyor, the lower end of said conveyor being in communication with said opening, a weir in said other compartment for overflow of liquid, said weir comprising a second partition extending downward in said other compartment dividing same into still another and weir compartment, this second partition also terminating short of the bottom of the vessel thereby providing a free passageway below this second partition connecting the bottoms of the other compartment and the weir compartment, said weir compartment having a vertically adjustable overflow conduit, a separating means, means for transferring liquid containing suspended solid matter from the upper portion of said one compartment to said separating means, and a conduit communicating said separating means with said one compartment at a level below said perforate means for passage of separated liquid.

References Cited in the file of this patent
UNITED STATES PATENTS

| | | |
|---|---|---|
| 2,226,532 | Hawley | Dec. 31, 1940 |
| 2,949,447 | Hawkins et al. | Aug. 16, 1960 |
| 2,953,557 | Wride et al. | Sept. 20, 1960 |
| 2,957,861 | Goins | Oct. 25, 1960 |